United States Patent
Szajnowski

(10) Patent No.: US 6,647,066 B1
(45) Date of Patent: Nov. 11, 2003

(54) METHOD OF DETERMINING A FREQUENCY OFFSET BETWEEN A SET FREQUENCY AND A DESIRED FREQUENCY FOR SYNCHRONIZATION WITH A MULTICARRIER SIGNAL

(75) Inventor: Wieslaw Jerzy Szajnowski, Surrey (GB)

(73) Assignee: Mitsubishi Denki Kabsuhiki Kaisha (JP)

( * ) Notice: Subject to any disclaimer, the term of this patent is extended or adjusted under 35 U.S.C. 154(b) by 0 days.

(21) Appl. No.: 09/429,309

(22) Filed: Oct. 28, 1999

(30) Foreign Application Priority Data

Oct. 30, 1998  (GB) .............................................. 9823812

(51) Int. Cl.[7] .............................................. H04L 27/28
(52) U.S. Cl. ...................................... 375/260; 375/364
(58) Field of Search ................................. 375/260, 371, 375/368, 364, 357, 354, 366, 372

(56) References Cited

U.S. PATENT DOCUMENTS

| | | | | |
|---|---|---|---|---|
| 5,802,117 A | * | 9/1998 | Ghosh ......................... | 375/344 |
| 6,035,003 A | * | 3/2000 | Park et al. ................... | 375/326 |
| 6,115,433 A | * | 9/2000 | de Lantremange .......... | 375/326 |
| 6,208,695 B1 | * | 3/2001 | Klank et al. ................. | 375/260 |
| 6,363,084 B1 | * | 3/2002 | Dejonghe ..................... | 370/480 |
| 6,363,131 B1 | * | 3/2002 | Beidas et al. ................ | 375/368 |
| 6,459,679 B1 | * | 10/2002 | Kim ............................. | 370/208 |

FOREIGN PATENT DOCUMENTS

| | | |
|---|---|---|
| EP | 0 729 250 | 8/1996 |
| GB | 2 313 527 | 11/1997 |

\* cited by examiner

*Primary Examiner*—Chi Pham
*Assistant Examiner*—Pankaj Kumar
(74) *Attorney, Agent, or Firm*—Rothwell, Figg, Ernst & Manbeck, PC

(57) ABSTRACT

A receiver is tuned into a multicarrier signal first by performing fine tuning control in the time domain, and then determining a coarse frequency offset to adjust the subcarrier to which the receiver is tuned. The coarse frequency offset is determined by summing the powers of a predetermined set of subcarriers associated with one frequency offset, repeating this for other frequency offsets, and determining whether the largest sum has a predetermined relationship to the other sums. Discrimination is improved by disregarding the largest of the powers when determining the sum. Preferably, the sums are integrated over multiple symbol periods, and the speed of locking-in is increased by terminating the operation when the predetermined relationship has been reached.

10 Claims, 6 Drawing Sheets

METHOD OF DETERMINING A FREQUENCY OFFSET BETWEEN A SET FREQUENCY AND A DESIRED FREQUENCY FOR SYNCHRONIZATION WITH A MULTICARRIER SIGNAL

BACKGROUND OF THE INVENTION

1. Field of the Invention

The present invention relates to the field of frequency synchronization in multicarrier communication systems, for example those which, for synchronization purposes, utilize pilot subcarriers with increased power. The invention is particularly, but not exclusively, concerned with the tuning of receivers for OFDM signals, for example digital video broadcast receivers.

2. Description of the Related Art

A multicarrier communication system utilizes a large number of equally spaced subcarriers for data transmission and for other auxiliary functions. In order to perform the demodulation process correctly, the receiver developed for such a system must be frequency-locked with a very small residual frequency offset. To facilitate frequency locking, a class of multi carrier communication systems employs a set of pilots transmitted at selected subcarriers with an increased power. These selected subcarriers should form a pilot insertion pattern with optimal autocorrelation characterized by low sidelobe values.

FIG. 1 shows an example of the power associated with the DFT coefficients reconstructed by a receiver in an ideal case when there is no noise or interference and the communication channel is distortionless. However, in practical applications the received signals are corrupted by wideband noise as well as by strong narrowband signals generated at some frequencies by various interfering sources. Furthermore, when the transfer function of the communication channel has not been corrected, the channel itself will introduce both magnitude and phase distortions. FIG. 2 illustrates the distortions resulting from a combined effect of frequency-selective fading, noise and strong interference occurring at some subcarrier frequencies. As seen, in this case discrimination between pilot subcarriers and data subcarriers is much more difficult which will result in a degraded performance of any system used for frequency locking.

FIG. 3 shows the two components of the total frequency offset $\Delta f$ comprising the fractional part $\epsilon \Delta f_c$ and the coarse frequency offset $J\Delta f_c$ where J is 2 in the illustrated example, and where $\Delta f_c$ is the subcarrier separation. Several time-domain methods are available for estimating and correcting the fractional frequency offset in a multi carrier communication system. However, the majority of methods proposed for estimating the coarse frequency offset are based on coherent processing which utilizes known phase relationships between signals to be discriminated. Such methods are not well suited for initiating the frequency acquisition process when the channel transfer function has not yet been corrected.

Aspects of the invention are set out in the accompanying claims.

SUMMARY OF THE INVENTION

The preferred embodiment of the invention enables the estimation of a coarse frequency offset by suitably processing received signals which may have been distorted severely by the uncorrected communication channel and may have been corrupted by wideband noise and strong narrowband interference.

In accordance with the preferred embodiment, a signal processing apparatus determines a frequency offset for tuning purposes by obtaining, for each of a plurality of candidate frequency offsets, the sum of the powers of a set of subcarriers. If certain conditions are met, the frequency offset associated with the largest of these sums is used for adjusting tuning.

Preferably, for each candidate frequency offset, the power sum excludes the U largest of the subcarrier powers, where U is an integer of one or more. It has been found that this avoids erroneous selection of a frequency offset as a result of strong interfering signals.

Preferably, a frequency offset is selected for tuning purposes only if the associated power sum bears a predetermined relationship with at least some of the power sums associated with the other frequency offsets. Preferably, the largest sum must bear a predetermined relationship with the average of the next L largest power sums, where L is an integer of one or more.

Preferably, the power sum associated with each frequency offset is integrated over a plurality of symbol periods, for more reliable determination of the desired frequency offset. Preferably, this operation ceases when a predetermined criterion is met, this criterion indicating with a high degree of reliability that the correct frequency offset has been determined. This means that the number of symbol periods needed for reliable frequency offset estimation is not fixed in advance, thus resulting in as short a lock-in period as possible.

To allow for variable observation periods, the criterion which establishes that the desired frequency offset has been determined is a function of the number of symbol periods used for observation.

The present invention can thus provide a signal processing apparatus which utilizes a sequential decision procedure to minimize the time required for determining a reliable estimate of a coarse frequency offset.

BRIEF DESCRIPTION OF THE SEVERAL VIEWS OF THE DRAWINGS

An arrangement embodying the invention will now be described with reference to the accompanying drawings, wherein.

DETAILED DESCRIPTION OF THE PREFERRED EMBODIMENTS

Figure 1:
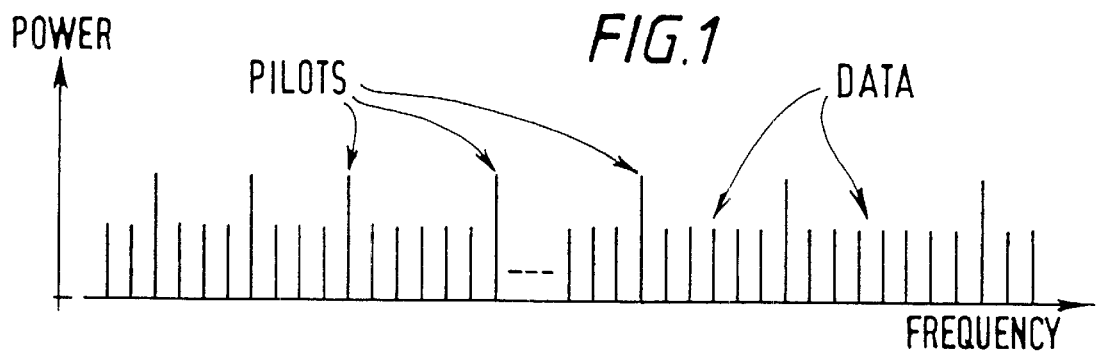
FIG. 1 shows an example of the power associated with the DFT coefficients reconstructed by a receiver in an ideal case when there is no noise or interference and the communication channel is distortionless.
Figure 2:
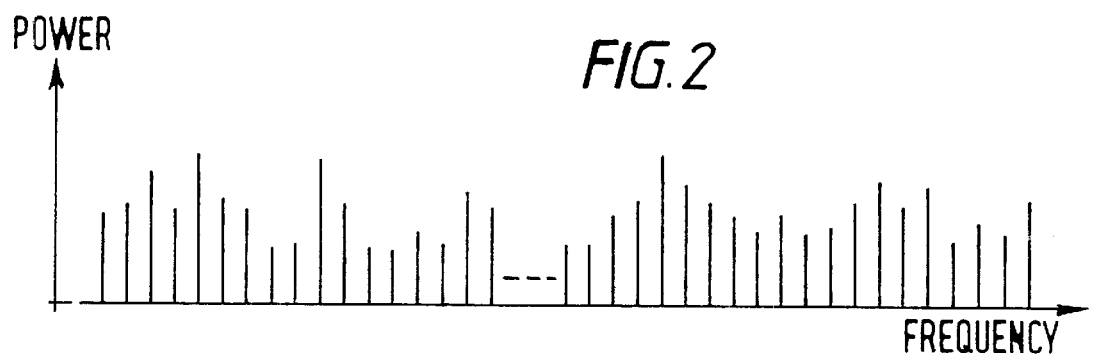
FIG. 2 shows a typical example of the power associated with the DFT coefficients reconstructed by a receiver when the received signal is corrupted by noise and strong interference and also distorted by the channel due to frequency-selective fading.
Figure 3:
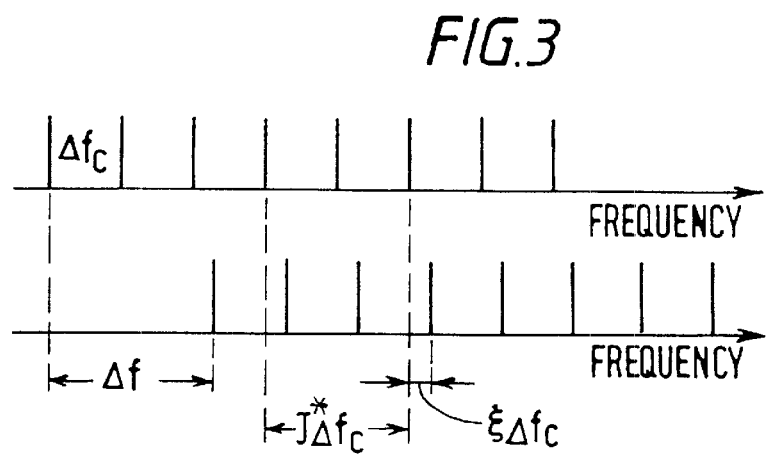
FIG. 3 illustrates the two components of the total frequency offset comprising the fractional part and the coarse frequency offset.
Figure 4:
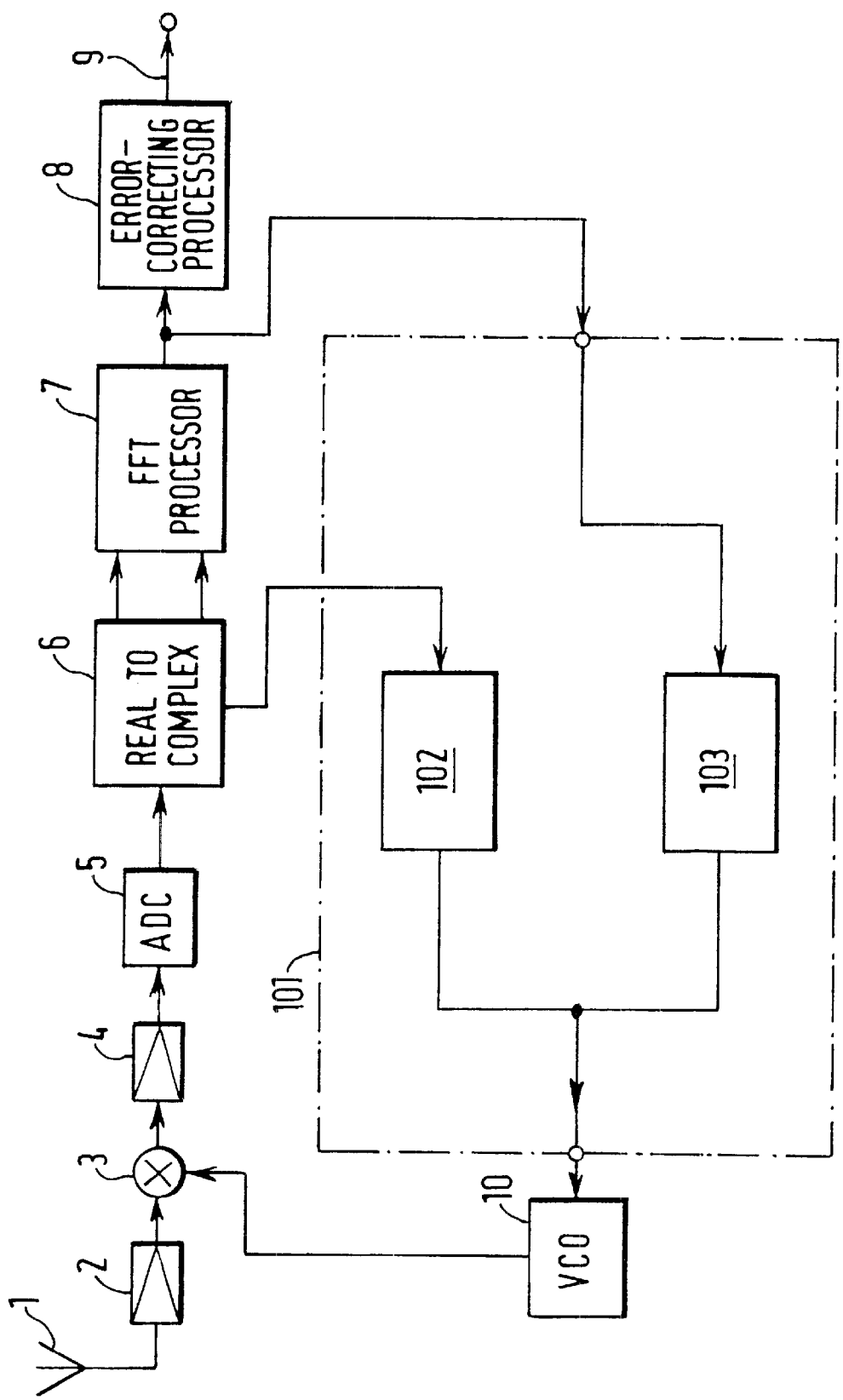
FIG. 4 is a block diagram of a receiver in accordance with the invention.

An embodiment of the invention, in the form of a digital broadcast receiver, will be described with reference to FIG. 4, which is a block diagram of the digital broadcast receiver.

The conventional part of this digital broadcast receiver comprises an antenna 1 that receives an QFDM multi carrier broadcast signal, a radio-frequency amplifier 2 that amplifies the received broadcast signal, a mixer 3 that down-converts the amplified signal to an intermediate frequency signal, an intermediate-frequency amplifier 4 that amplifies the intermediate-frequency signal, an orthogonal demodulator 5 that demodulates the amplified intermediate-frequency signal to produce in-phase (I) and quadrature (Q) baseband signals, an analog-to-digital converter (ADC) 6 that converts these baseband signals to a complex-valued digital signal, a fast-Fourier-transform processor 7 that executes a discrete Fourier transform on this digital signal to obtain the sub-symbol data for each subcarrier, an error-correcting processor 8 that detects and corrects errors in the sub-symbol data, an output terminal 9 to which the sub-symbol data are supplied, and a voltage-controlled oscillator (VCO) 10. The voltage-controlled oscillator 10 is used as a local oscillator that supplies the mixer 3 with a signal tuned to a frequency differing from the OFDM broadcast frequency by a fixed amount. The oscillator 10 receives a control signal from a tuning controller 101 coupled to the output of the FFT processor 7.

It is assumed that the fractional frequency offset has been corrected by employing one of the available time-domain techniques well known to those skilled in the art, using a fine frequency control circuit 102 coupled to receive the output of the ADC 6. It is similarly assumed that the symbol timing has been estimated so that the received signals can be sampled efficiently with minimal timing error.

The coarse frequency control circuit 103 is used to ensure that the respective subcarriers are located at the correct positions.

Assume that there are P pilots transmitted at subcarriers with indies $k_1, k_2, \ldots, k_P$. The ordered set of these indices will be referred to as the pilot insertion pattern. It is also assumed that the range of possible coarse frequency offsets, measured in multiples of the subcarrier spacing, is $$(-J_{min}, -J_{min}+1, \ldots, -1, 0, 1, \ldots, J_{max}-1, J_{max}).$$

Therefore, the total number of possible offsets is equal to $(J_{min}+J_{max}+1)$.

Figure 5:
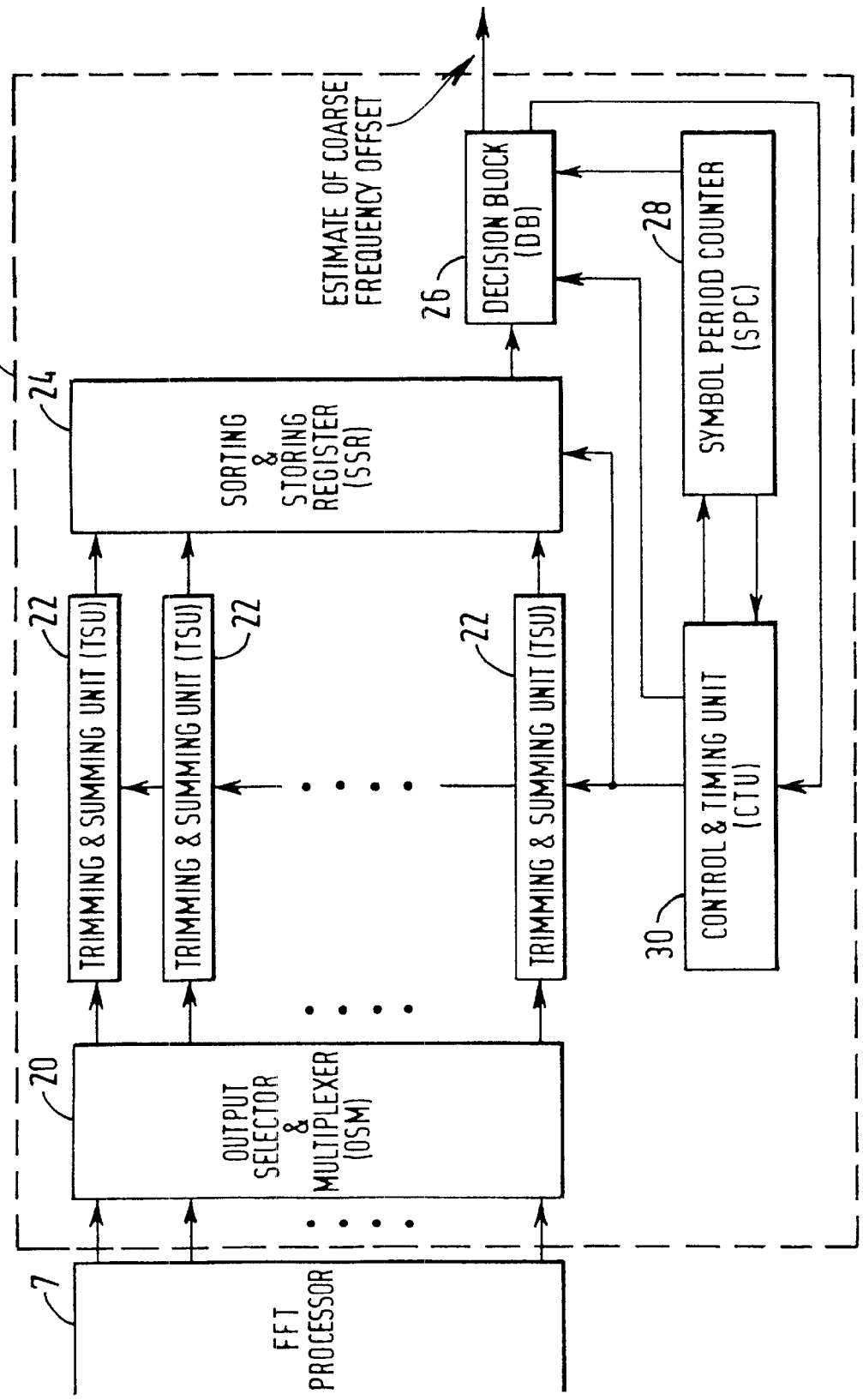
FIG. 5 is a block diagram of an apparatus used in the receiver for non-coherent estimation of a coarse frequency offset.

FIG. 5 is a block diagram of the coarse frequency control circuit 103 for non-coherent estimation of a coarse frequency offset. The outputs of the FFT processor 7, performing the discrete Fourier transform (DFT) for demodulation purposes, are connected to the inputs of an output selector and multiplexer (OSM) 20. The OSM has $(J_{min}+J_{max}+1)$ output channels and each channel provides P complex DFT coefficients corresponding to a respective frequency-shifted version of the pilot insertion pattern. These are presented to $(J_{min}+J_{max}+1)$ trimming and summing units (TSUs) 22 for processing DFT coefficients which represent the original pilot insertion pattern and its $(J_{min}+J_{max})$ versions shifted in frequency by all possible coarse frequency offsets.

Figure 6:
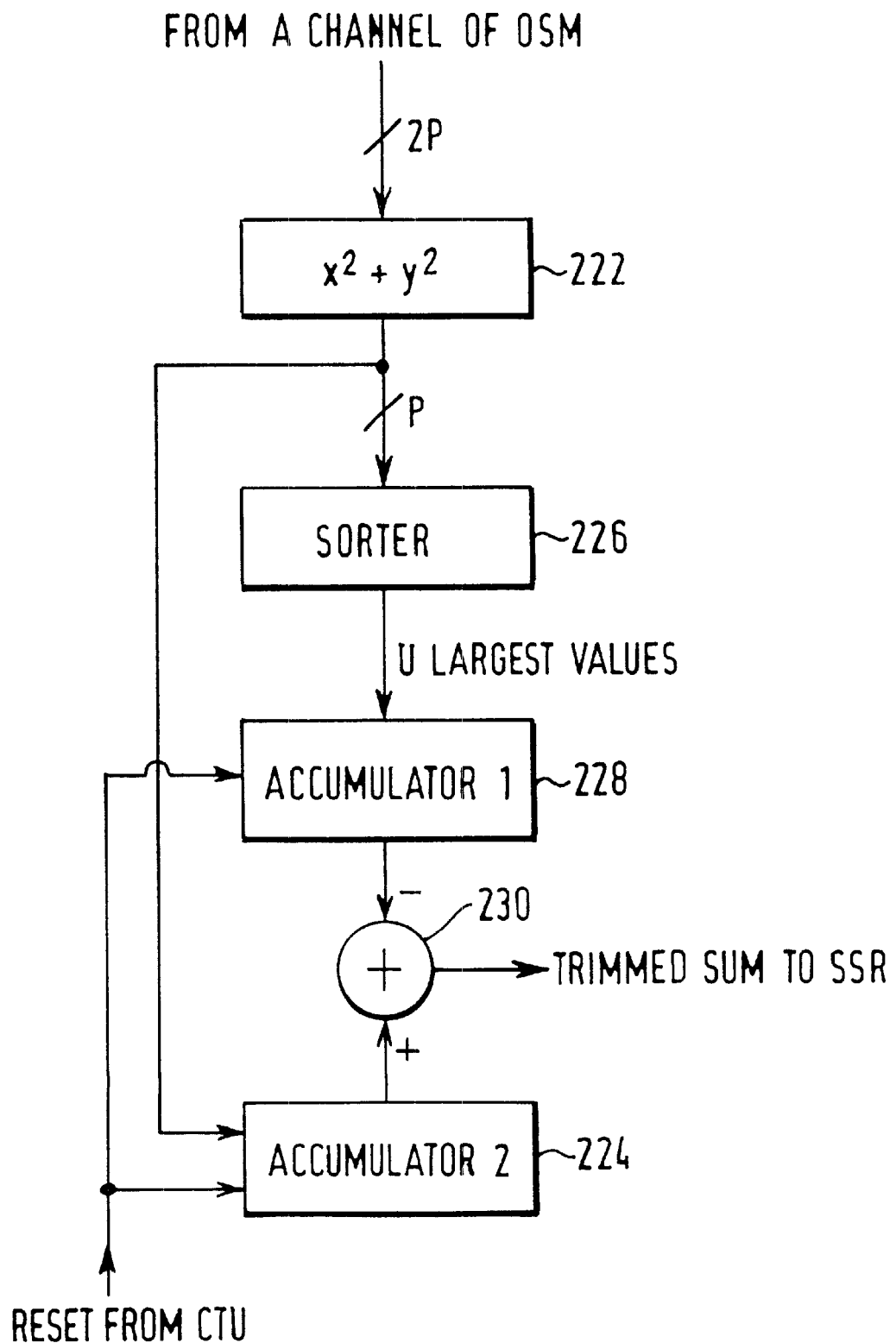
FIG. 6 is a block diagram of a trimming and summing unit (TSU) of the apparatus.

A functional block diagram of each TSU 22 is presented FIG. 6. The TSU implements the following operations.

First, at block 222 each complex DFT coefficient is used to calculate $$q=x^2+y^2$$

where x and y are the real and imaginary part of the DFT coefficient, respectively. All the power values are summed by an accumulator at block 224. These power values are also sorted at block 226. The largest U values (U is an integer of 1 or preferably more) are summed by an accumulator at 228. The result is then deducted, at 230, from the sum produced at 224. Thus, a "trimmed" sum S is formed by disregarding the U largest values of q and adding together the remaining (P-U) values. The purpose of trimming is to increase the statistical distance between distributions representing different classes of signals thereby facilitating their discrimination. The effect is to avoid erroneous assumptions that the correct frequency offset has been found due to detection of large powers, where these large powers are instead a result of, for example, strong interfering signals. The value U can be chosen empirically.

Because the TSUs operate in parallel, $(J_{min}+J_{max}+1)$ trimmed sums are fed simultaneously to the inputs of a sorting and storing register (SSR), shown at 24 in FIG. 5.

Figure 7:
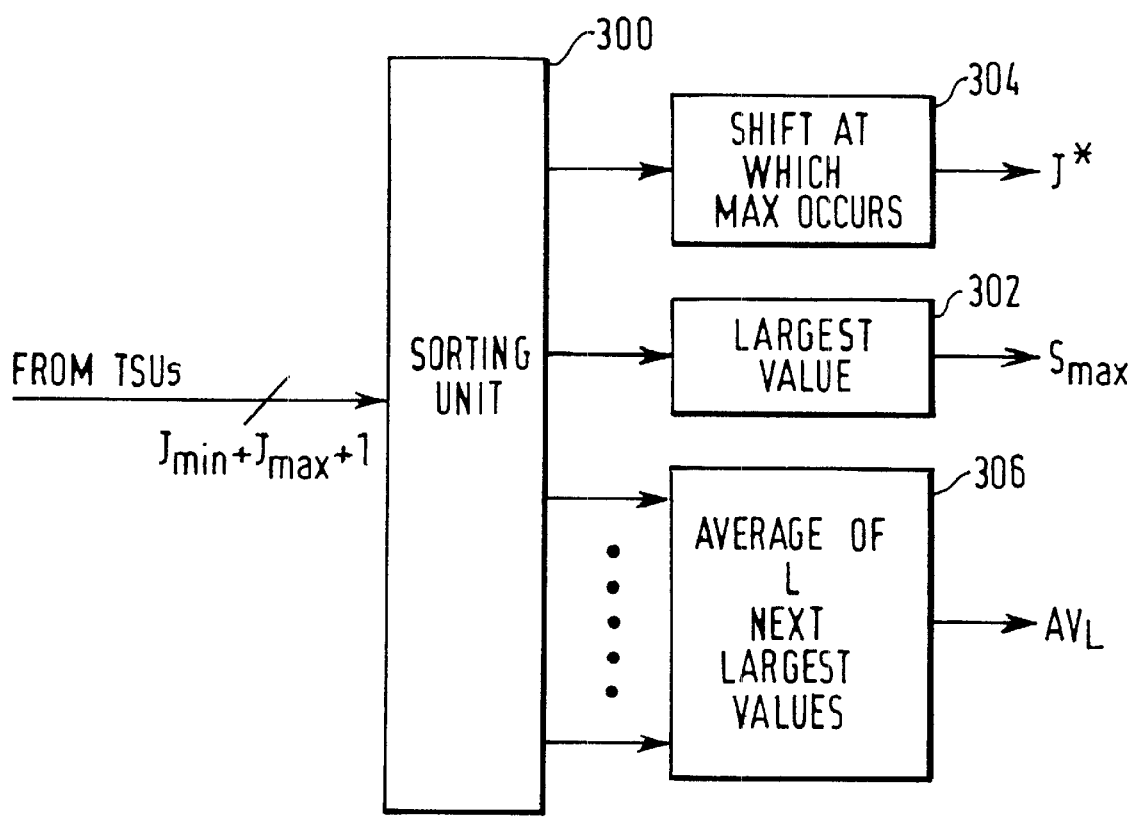
FIG. 7 is a block diagram of a sorting and storing register (SSR) of the apparatus.

FIG. 7 is a functional block diagram of an SSR 24. The operations performed by the SSR can be summarized as follows:

at block 300 sort the trimmed sums S from the TSUs;

at block 302 select the greatest of the trimmed sums $S_{max}$;

at block 304 store the value of the shift, say J*, corresponding to this greatest trimmed sum;

at block 306 calculate the average $AV_L$ of the L "next" largest trimmed sums.

supply the three above values to the decision block (DB) shown at 26 in FIG. 5.

Figure 8:
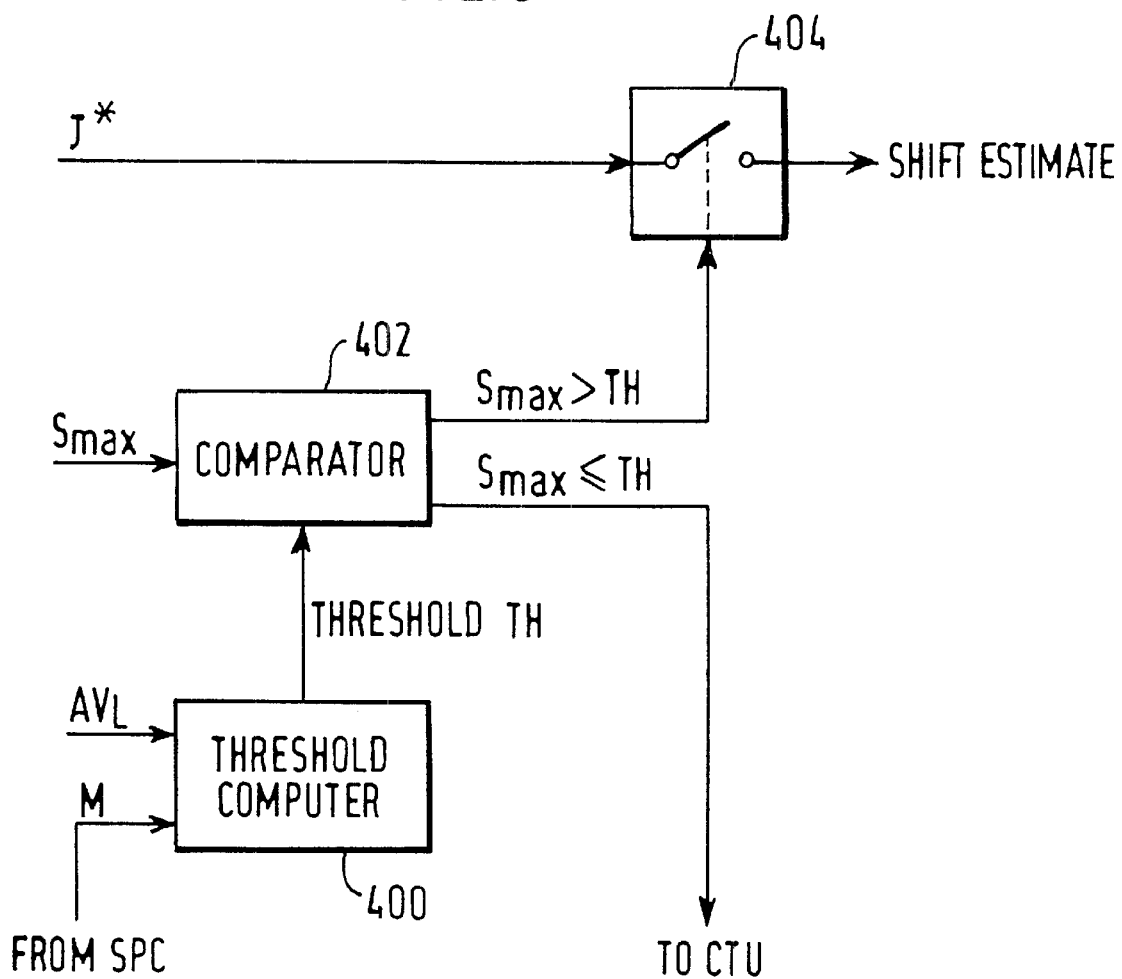
FIG. 8 is a block diagram of a decision block (DB) of the apparatus.

A block diagram of the decision block (DB) 26 is shown in FIG. 8. The decision block utilizes the information provided by the SSR 24 and by a symbol period counter (SPC) 28 (FIG. 5) at block 400 to determine the value of the decision threshold according to the formula $$TH=AV_L[1+h/\sqrt{(L\ M)}]$$

where M is the number of symbol periods used for observation and h is a constant, preferably greater than 0.6. The value of h may be chosen empirically, to achieve a good compromise between lowering the probability of obtaining an incorrect estimate (leading to false-locks) and decreasing the total observation time required to make a decision (time to lock).

Next, at block 402, the DB compares the value of $S_{max}$ to the calculated threshold value TH. If $S_{max}$ exceeds the threshold TH, then at block 404 the value of the shift J* is used as an estimate of the coarse frequency offset, measured in multiples of the subcarrier spacing. However, if the threshold TH has not been exceeded, then the information available is not sufficient to determine a reliable estimate of the offset and additional observations obtained from the next symbol period will have to be processed. This sequential decision procedure is terminated when the threshold TH has been exceeded by $S_{max}$ or the procedure is aborted when the total number of observed symbol periods M has reached a predetermined maximum value $M_{max}$. Therefore, in extreme cases, especially for small values of $M_{max}$ and severe spectrum distortions, it is possible to terminate the sequential procedure without obtaining an estimate of the frequency shift. Incidentally, although it is preferable that the apparatus consider every successive symbol period, this is not essential; alternative periods could, for example, be disregarded;

The operation of the blocks and units described above is initiated by a control and timing unit (CTU) 30 in FIG. 5 which resets all accumulators, registers and counters. The CTU also determines when the sequential decision procedure is to be terminated or aborted.

The symbol period counter (SPC) 28 determines the number M of symbol periods which have been processed since the initialization up to the current stage of the sequential estimation procedure. This information is used by the decision block (DB) to determine the value TH of the adaptive decision threshold as described above. The current value of M is also used by the CTU 30 to decide whether to abort the sequential procedure without producing a frequency shift estimate.

In a particular embodiment for use with a 2K OFDM signal (i.e. having 2000 subcarriers), it has been found particularly desirable to have $J_{min}=J_{max}=20$, and thus there are 41 possible offsets, P=45, U=8 or preferably 4, and L=12, although of course each of these could independently be altered if desired.

The embodiment described above may be implemented entirely in hardware, using for example an ASIC with appropriately designed logic gates. Alternatively, some or all of the functions may be performed by one or more appropriately-programmed general-purpose processor units. If several functions are to be performed by individual processor units, it may be desirable or necessary for these functions to be performed in serial, rather than in parallel.

Although the invention has been described in the context of multicarrier signals wherein the pilot subcarriers have increased power, by suitable modification it could be used with signals in which the pilots have decreased, or no, power (by looking for minima of the calculated powers), or signals in which the powers vary according to time and/or subcarrier index (by looking for predetermined distributions of the calculated powers).

What is claimed is:

1. A method of determining a frequency offset between a set frequency and a desired frequency for synchronization with a multicarrier signal, the method comprising:
    (a) selecting a frequency offset, and, for that offset, determining the sum of powers of a predetermined set of subcarriers;
    (b) performing step (a) for other selected offsets; and
    (c) providing a signal representing the frequency offset associated with a selected one of said sums when there is a predetermined relationship between that sum and at least some of the other sums;
    wherein said selected sum is the largest of the sums; and
    wherein the sum of powers determined for each frequency offset disregards the U largest of the powers, where U is an integer of 1 or more.

2. A method as claimed in claim 1, wherein U is 4 or more.

3. A method as claimed in claim 1, wherein the predetermined relationship is a function of the average $AV_L$ of the L next largest of said sums, wherein L is an integer of 1 or more.

4. A method as claimed in claim 1, wherein the power sums are integrated over a plurality of M of symbol periods.

5. A method as claimed in claim 3, wherein the frequency offset determination method stops when said predetermined relationship is met, so that the number M is variable.

6. A method as claimed in claim 5, wherein said predetermined relationship is a function of M.

7. A method as claimed in claim 6, comprising further step of:
    comparing the largest sum with:

$$AV_L[1+h/\sqrt{(L\ M)}]$$

where h is a predetermined constant, to determine the predetermined relationship.

8. A method of tuning a receiver to a multicarrier signal, the method comprising performing coarse tuning by using a frequency offset determined by a method as claimed in claim 1;
    wherein the coarse tuning is performed after performing a fine tuning operation in order substantially to bring the tuning frequency into a predetermined relationship with a subcarrier frequency, the coarse tuning then being performed to alter the subcarrier frequency to which the tuning frequency is matched; and
    wherein the fine tuning operation is performed in the time domain.

9. A multicarrier broadcast signal receiver, the receiver having a tuning control operable to perform a tuning operation according to claim 8.

10. A broadcast receiver as claimed in claim 9, suitable for receiving digital video broadcast signals.

* * * * *